(12) United States Patent
Ahlgren et al.

(10) Patent No.: US 6,743,280 B1
(45) Date of Patent: Jun. 1, 2004

(54) METHOD AND APPARATUS FOR PARTICLE SEPARATION INCLUDING MECHANICAL SEPARATION OF PARTICLES

(75) Inventors: Lennart Ahlgren, Oxelösund (SE); Erik Rensfelt, Nyköping (SE)

(73) Assignee: TPS Termiska Processer AB, Nyköping (SE)

( * ) Notice: Subject to any disclaimer, the term of this patent is extended or adjusted under 35 U.S.C. 154(b) by 58 days.

(21) Appl. No.: 10/030,624
(22) PCT Filed: Jul. 11, 2000
(86) PCT No.: PCT/SE00/01478
§ 371 (c)(1), (2), (4) Date: Feb. 25, 2002
(87) PCT Pub. No.: WO01/06178
PCT Pub. Date: Jan. 25, 2001

(30) Foreign Application Priority Data

Jul. 15, 1999 (SE) ............................................. 9902711

(51) Int. Cl.$^7$ ............................................. B01D 45/08
(52) U.S. Cl. ........................ 95/267; 55/443; 208/127; 208/153; 208/161; 110/245; 122/4 D
(58) Field of Search ........................ 110/245; 122/4 D; 95/267, 108; 55/442, 443, 444; 96/150; 422/177, 178; 208/127, 153, 161

(56) References Cited

U.S. PATENT DOCUMENTS

| | | | |
|---|---|---|---|
| 4,253,425 A | 3/1981 | Gamble et al. | |
| 4,712,514 A | 12/1987 | Xu-Yi et al. | |
| 4,856,460 A | 8/1989 | Wied et al. | |
| 5,025,755 A | 6/1991 | Eickvonder et al. | |
| 5,064,621 A | 11/1991 | Uyama et al. | |
| 5,070,822 A | 12/1991 | Kinni et al. | |
| 5,253,741 A | 10/1993 | Gorzegno | |
| 6,045,688 A | * 4/2000 | Ruottu et al. ............... | 208/113 |

FOREIGN PATENT DOCUMENTS

GB  2 130 118 A  5/1984

* cited by examiner

Primary Examiner—Robert A. Hopkins
(74) Attorney, Agent, or Firm—Burns, Doane, Swecker & Mathis, L.L.P.

(57) ABSTRACT

The present invention relates to a method for separating entrained particles from a gas in a fluidised bed reactor system and fluidised bed reactor system including a particle separator for separating entrained particles from a gas. The particles are separated from the gas flowing in a direction other than the main gas flow direction, whereby the separation is multidimensional. The gas is allowed to pass from the outside of the configuration to the inside thereof and/or vice versa, wherein the particles are separated from the gas during such a travel. The gas flow can be multileveled.

20 Claims, 8 Drawing Sheets

METHOD AND APPARATUS FOR PARTICLE SEPARATION INCLUDING MECHANICAL SEPARATION OF PARTICLES

TECHNICAL FIELD OF THE INVENTION

The present invention relates to a method for separating entrained particles from a gas in a fluidised bed reactor system and a fluidised bed reactor system including a particle separator for separating entrained particles from a gas.

BACKGROUND ART

In the fields of pyrolysis, gasification and combustion, it is common to provide the reactor of a boiler or a combustion apparatus with a bed of particles, which, among other advantages, greatly enhances heat transfer because of the high heat carrying capacity of the particles. The bed is usually placed in the lower portion of the reactor. Fluidising air or gas entrains the particles with a gas flow inside the reactor. At the upper portion of the reactor, or outside the reactors the particles are separated from the gas flow by separators. In a circulating fluidised bed the particles are recirculated to the lower portion of the reactor, from where they can once again be entrained in the gas flow.

There are basically two types of separators: non-centrifugal mechanical particle separators and cyclone-type particle separators.

Examples of non-centrifugal mechanical particle separators are disclosed in WO 83/03294, U.S. Pat. No. 5,025,755, U.S. Pat. No. 5,082,477 and U.S. Pat. No. 5,064,621.

In WO 83/03294 a boiler is disclosed having a non-centrifugal mechanical particle separator outside the reactor.

In U.S. Pat. No. 5,025,755 an apparatus is disclosed having a non-centrifugal mechanical particle separator in the upper portion of the reactor.

An example of a cyclone-type particle separator disposed in the upper portion of a reactor is disclosed in U.S. Pat. No. 5,070,822.

SUMMARY OF THE INVENTION

An object of the present invention is to achieve a compact particle separator.

Another object of the invention is to achieve a particle separator that is easily mountable and demountable inside a reactor.

These and other objects which will become apparent in the following are achieved by a fluidised bed reactor system and a method for separating particles as defined in the accompanied claims.

The present invention is based on the insight of the advantages of separating particles in a direction other than the "main flow direction". The term "main flow direction" is generally referred to here as the direction of a line drawn between a point before the gas enters the separator and a point after the gas exits the separator. In prior art non-centrifugal mechanical separators, the separator elements are conventionally positioned so as to separate the particles from the gas flowing substantially in the "main flow direction". In other words, the separation direction is one-dimensional. According to the present invention, however, the particles can be separated from the gas flowing in a direction other than the "main flow direction", whereby the separation is multidimensional.

Also, it has been realised that the particle separator can be made compact in a configuration that allows the gas to pass from the outside of the configuration to the inside thereof and/or vice versa, wherein the particles are separated from the gas during such a travel.

According to one aspect of the present invention a method is provided for separating entrained particles from a gas in a fluidised bed reactor system which comprises a separation region defined by a cylindrical r-,φ-,z-coordinate system, the method comprising the consecutive steps of:

leading the gas in the z-direction (axial direction), diverting the gas to flow substantially in the r-direction (radial direction), while keeping the gas circumferentially distributed in rφ-planes, and mechanically separating the particles from the gas while the gas is flowing substantially in the r-direction.

According to another aspect the present invention provides a fluidised bed reactor system including a particle separator for separating entrained particles from a gas having a flow path. The particle separator comprises a set of non-centrifugal mechanical separator elements disposed in the flow path of the gas, so that the gas is able to pass between the separator elements while the inertia of the particles directs them to the separator elements upon which they impinge and are separated and removed from the gas flow. The set of separator elements is arranged in a configuration having a centre zone with a centre axis, and a circumference. Directional means are provided for directing the gas so that gas passing through the set of separator elements flows from the circumference to the centre zone of the configuration and/or vice versa.

Thus, as mentioned above, according to the present invention the particles are separated from the gas multidimensionally instead of the traditional one-dimensional separator passage as far as non-centrifugal mechanical particle separator elements are concerned. In mathematical terms, instead of a separation in the x-direction in an orthonormal x-,y-,z-coordinate system, the present invention provides separation in the r-direction in a cylindrical r-,φ-,z-coordinate system, where:

$$r = x \cdot \cos \phi + y \cdot \sin \phi$$

Hence, the region where the separation is performed is conveniently defined by a cylindrical coordinate system. Gas will be led to flow in the z-direction or axial direction of the separation region. Thereafter, the gas is diverted to flow substantially in the re-direction or radial direction of the separation region. This does not necessarily mean that the gas will be diverted in a direction which is totally perpendicular to the axial direction, but merely that the gas will flow to or from a centre zone. During this diverting action the gas is kept circumferentially distributed in rφ-planes, i.e. disk shaped planes. Accordingly, the gas does not have to flow from or to just one side of the separation region, but substantially from or to the whole circumference of the separation region. It is during this radial flow that the particles are separated from the gas.

According to a further aspect the separator elements are arranged as a structure having consecutive particle separation levels $X_N$ ($X_1, X_2, X_3, \ldots, X_n \ldots$), N being an integer. The directional means are arranged at the circumference and at the centre zone of the configuration, so as to cause the gas to flow through the separator elements in one direction on levels with odd-numbered N and in the reversed direction on levels with even-numbered N.

The obvious advantage of this is that, when the separator elements preferably being provided as one set of separator elements, one and the same separator element is passed by the flowing gas repeated times. Thus particles that have not impinged upon the separator at the first pass, can be captured on the following pass(es), thus making the most of each separator element.

Aptly, the configuration has a generally cylindrical shape, preferably with the separator elements being arranged essentially symmetrically. Note that the term "cylindrical" does not necessarily imply that the cross-section is circular.

Preferably, the separator elements have an elongated shape and extend essentially in parallel with the centre axis.

It is advantageous to use channel-shaped beams as separator elements, the beams having an essentially U-shaped cross-section. The beams are arranged so that the particles impinge upon the bottom of the U and then fall down, guided by the channel-shaped beam, to be collected.

In order to further enhance the efficiency of the system, the set of separator elements can form a number of ring-shaped arrays being placed within each other. The separator elements of an array are preferably circumferentially displaced with respect to the separator elements of an adjacent array.

Consequently, the separator elements of the different arrays can be arranged in a staggered way with an angular offset with respect to each other. Those particles that do not impinge on separator elements of one array can be disentrained from the gas to a great extent by the separator elements of an adjacent array. Of course the number of arrays is chosen according to what is considered appropriate, with respect to compactness, efficiency etc.

According to a specific embodiment, each separator element, being in form of a U-shaped beam, is provided with a respective additional U-shaped beam attached in parallel thereto. Moreover, each of the additional U-shaped beams is provided with a respective further U-shaped beam attached in parallel thereto, forming a unit with three U-shaped beam channels. Dividing plates are inserted in at least two U-shaped beam channels for mechanical segregation of said channels and a section of at least one of the elements in the unit is removed, so as to create three particle separation levels of impinge areas, one for each element in the unit. Directional means are arranged to direct the gas in alternating level directions.

A three-channel unit design can be constructed with three identical U-beams or with three non-identical U-beams. For instance, a tapered design may be used. This is particularly practical inside a circular reactor shaft, in which case the element located nearest the shaft centre would have a smaller cross-section than the intermediate element, which in turn would have a smaller cross-section than the element furthest away from the centre.

Due to the configuration of a particle separator according to the invention, it is particularly suitable for disposal inside a reactor shaft. Even though the separator elements are preferably arranged in a symmetrical and circular configuration, it is also possible to arrange the separator elements in other configurations, such as triangular, square, other polygon or in any other desired way. When the particle separator is intended to be used inside a reactor shaft, it is favourable to have the configuration adapted to the cross-section of the reactor shaft.

After the particles have been disentrained they fall down from the separator elements to some form of collector located below. The disentrained particles can advantageously be recycled to the reactor bed by a standpipe.

When the particle separator is disposed inside the reactor, an internal standpipe located around the centre axis of the reactor can be used. In this case, the fluidising gas with entrained particles suitably flows from the bottom portion to the top portion of the reactor, generally symmetrically around the internal standpipe. The particle separator, preferably being disposed at the top portion of the reactor, disentrains the particles from the gas, which exits the reactor. The particles are then recycled through the internal standpipe in the centre of the reactor.

Of course it is also possible to let an internal standpipe be positioned off-centred, e.g. extending along the wall of the reactor. In this case it might be desirable to have more than one standpipe. The choice of an off-centred alternative provides for the possibility of letting the gas enter the particle separator from the centre of the configuration and consequently the disentrained particle can advantageously be caused to fall down at the circumference thereof.

The above description is related to a circulating fluidised bed. The person skilled in the art will realise that the present invention can be utilised in other connections as well. The skilled person will also realise that the particle separator of the present system can be located outside a reactor, and not only inside.

BRIEF DESCRIPTION OF THE DRAWINGS

The invention will be more closely described in the following in relation to non-limiting embodiments thereof with reference to the drawings, in which.

DETAILED DESCRIPTION OF PREFERRED EMBODIMENTS OF THE INVENTION

Figure 1:
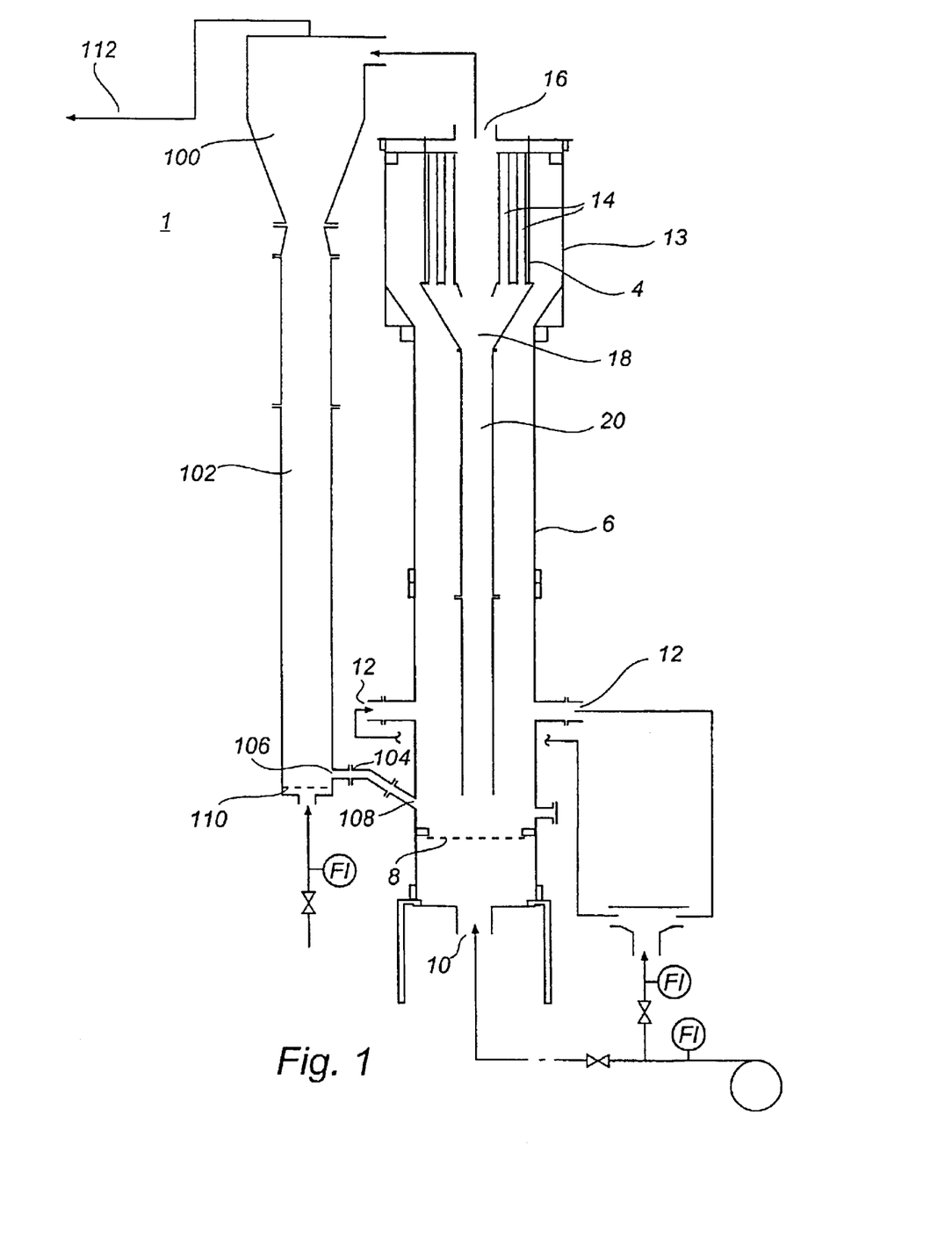
FIG. 1 illustrates schematically a cross-section of a fluidised bed reactor system according to the present invention.

FIG. 1 illustrates schematically a cross-section of a circulating fluidised bed reactor system 1, comprising a particle separator 4, according to the present invention. The system 1 has an elongated reactor 6, in which a particle bed is disposed in the lower portion of the reactor 6 on a distributor plate 8. Below the bed is an inlet 10 for primary gas, and above are two inlets 12 for secondary gas. The reactor 6 has an enlarged cylindrical top portion, the outer wall 13 of which has a larger diameter than the rest of the reactor 6. A particle separator 4 having elongated U-shaped beams 14 as separator elements, constituting a cylindrical configuration, is housed in said top portion. In use, the flow path of the gas is as follows. Primary gas enters the reactor 6 through the inlet 10 for primary gas, is distributed by distributor plate B, entrains particles from the particle bed, travels vertically up the reactor 6, mixes with secondary gas entering from the inlets 12 for secondary gas, reaches the particle separator 4 where the only path available for the gas is horizontally through the particle separator 4, thus passes the U-shaped beams 14 and finally exits vertically through a gas outlet 16.

However, the majority of the particles entrained in the gas flow are separated therefrom by-the elongated U-shaped beams 14. The particles fall into a funnel-shaped particle collector 18 and are returned to the bottom portion of the reactor 6 through an internal standpipe 20, so that they can be entrained in the gas flow again. The standpipe 20 extends in the centre of the reactor 6 from the bottom of the particle collector 18 to a level between the inlets 12 for secondary gas and the distributor plate 8.

The gas and any particles by-passing the U-shaped beams 14 then pass to a conventional cyclone 100. Material disentrained by the cyclone 100 fall into an external standpipe 102 and are recycled through a line 104 running from a port 106 just above the base of the external standpipe 102 to a port 108 on the reactor 6 between the distributor plate 8 and the inlets 12 for secondary gas. Recirculation is initiated by fluidisation of the external standpipe 102 via a distributor plate 110 at the base. Gas from the cyclone 100 passes to an exhaust stack 112.

Figure 2:
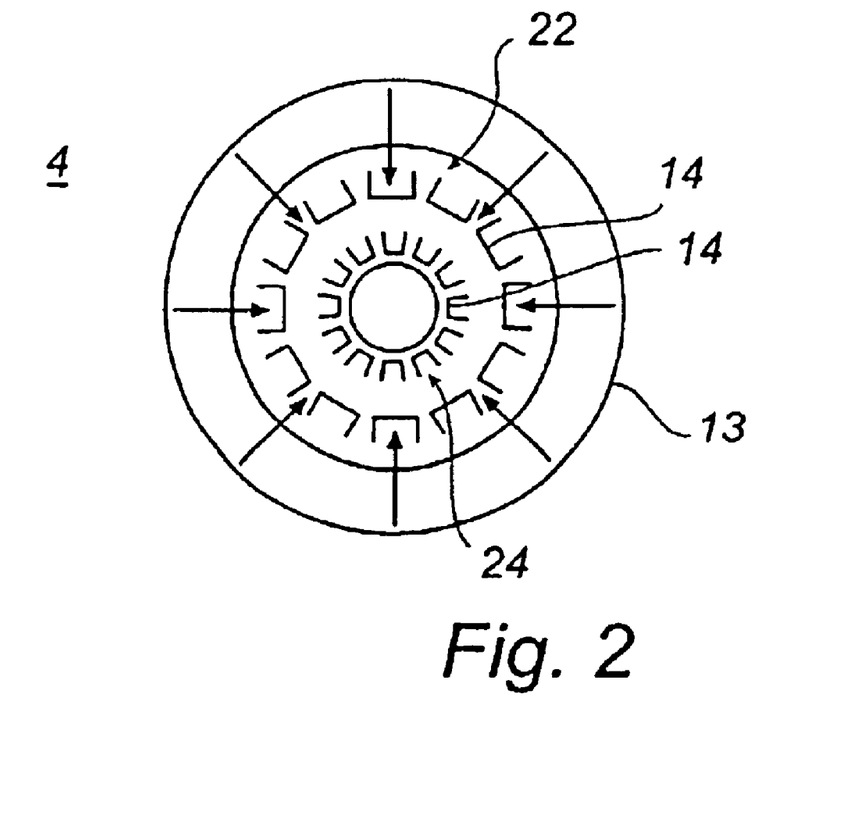
FIG. 2 illustrates an example of a cross-section through the particle separator in the top portion of the reactor in FIG. 1.

FIG. 2 illustrates an example of a cross-section through the particle separator 4 in the top portion of the reactor 6 in FIG. 1. As can be seen, two rings 22, 24 of U-shaped beams 14 are arranged concentrically, within the outer wall 13 of the top portion. The small arrows indicate the direction of the gas as it enters the configuration. Even though the figure illustrates a radial gas flow from the outside to the inside of the configuration, the skilled person appreciates that the reverse direction would also be practicable, in which case the U-shaped beams 14 would suitably be turned around with the opening of the U facing inwards. In the figure the beams of the inner ring 24 are displaced in the circumferential direction of the reactor with respect to the beams of the outer ring 22. With this arrangement the beams of the inner ring 24 effectively shield the gas that by-passes the beams of the outer ring 22.

Figure 3A:
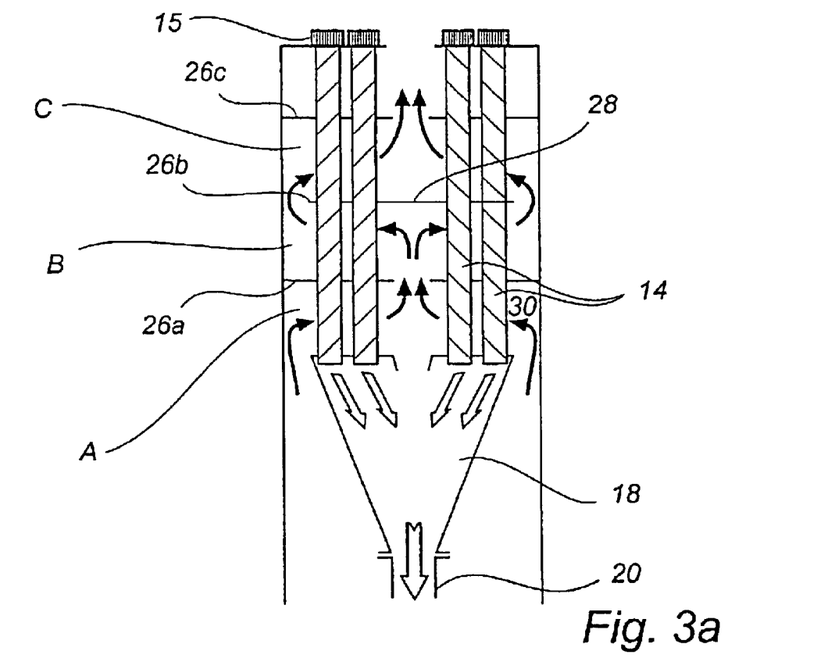
FIGS. 3a–3b illustrate different particle separator arrangements.

FIG. 3a illustrates a configuration having a stacked multileveled gas flow. The top of each beam 14 is mounted to a suspension attachment 15 so that the beams 14 are vertically suspended. The beams 14 can be freely suspended so as to allow them to expand in their longitudinal direction as the temperature rises. The illustrated configuration of beams can be said to comprise three main levels or sections; a lower section A, a middle section B and an upper section C. The beams 14 are supported by horizontal support plates 26a–c (three shown) connected by support bars (not shown) to hold the support plates 26a–c in correct vertical alignment. The support plates 26a–c define the top of each section A–C. A cover plate 28 disposed in the centre of the configuration is mounted on top of the middle support plate 26b. The support plates 26a–c and the cover plate 28 forces the gas to flow in alternating level directions, as indicated by the solid arrows in the figure. Thus, when the gas vertically enters the configuration at the lower section A, the support plate 26A redirects it into the horizontal direction to a radial inwardly flow. Next the gas passes up to the middle section B, where it is forced by the cover plate 28 to once again flow horizontally, this time in a radial outwardly flow. Thereafter, having reached the upper section C, the gas is forced to flow inwardly by the support plate 26c. Finally, the gas vertically exits the configuration form the centre thereof. Naturally, support plate 26c could be removed without substantially altering the flow path of the gas. Furthermore, although not shown in the figure, the support plate positioning can be made variable and, thus, so can the beam height, making it possible to utilise a larger or smaller part of the beams according to preference. The non-solid arrows represent particles separated from the gas flow falling from the bottom of the U in the beams into the funnel-shaped collector 18 and then passing to the internal standpipe 20. Thus, the particles will impinge on the inside bottom of the U in the beams at sections A and C, if the beams are oriented as in FIG. 2. Of course it would also be possible to turn them in the reverse orientation, or to arrange the beam rings with different orientations, one beam ring with the opening of the U facing the centre and the other beam ring with the opening of the U facing the circumference.

Figure 3B:
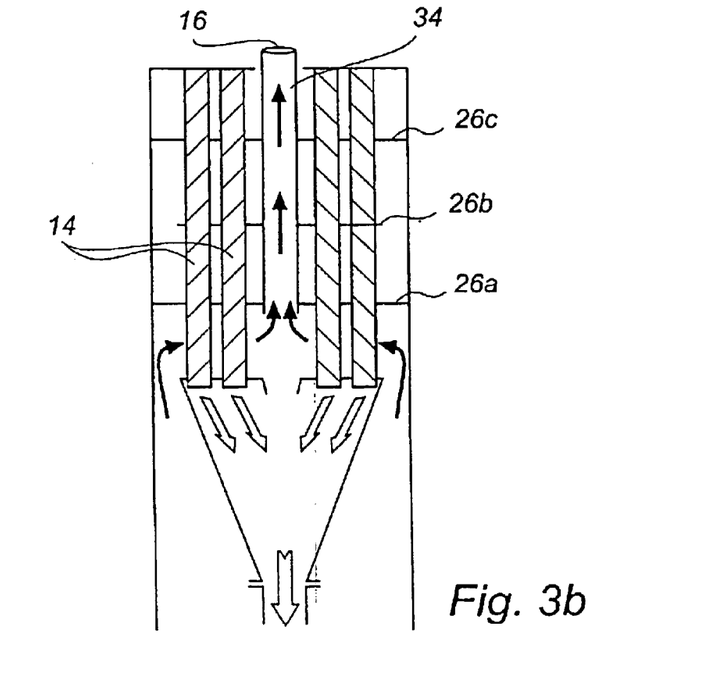

In FIG. 3b the cover plate 28 in FIG. 3a has been removed and a pipe 34 has been inserted extending from the lower support plate 26a to the gas outlet 16. Thus, the gas flows past the U-shaped beams 14 only once. This arrangement gives a shorter residence time through the particle separator, which at times might be preferred. Depending on stability requirements, the alternative would be to remove the support plates 26a–c in order to take advantage of the full length of the beams 14, as shown in FIG. 1, or only to change the positioning of the support plate 26a–c in order to obtain a desired length.

Figure 4A:
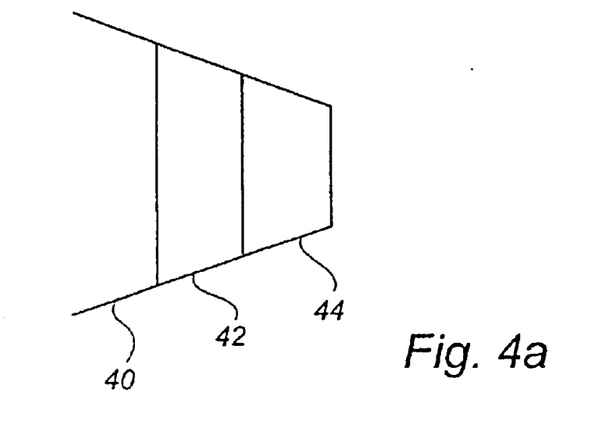
FIGS. 4a–4c illustrate different types of separator element units consisting of three integrated U-shaped beams.
Figure 4B:
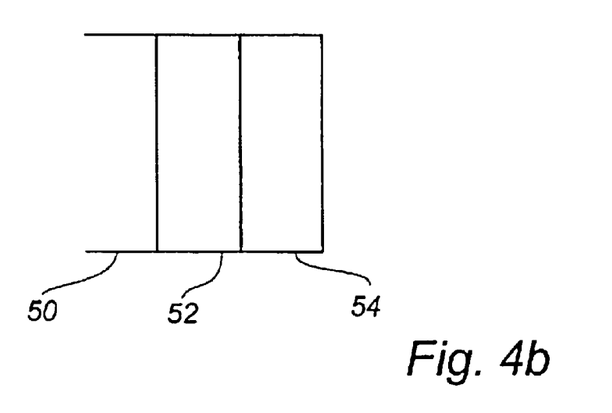
Figure 4C:
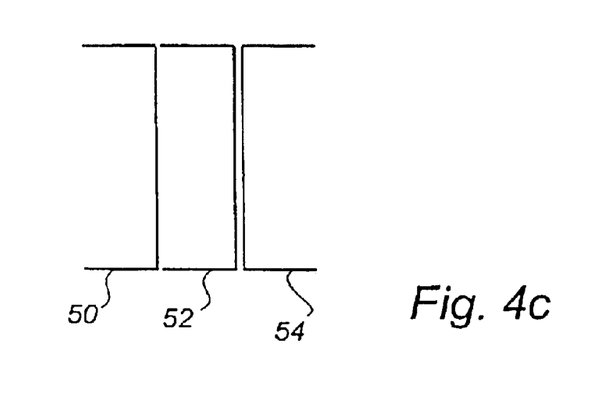

FIGS. 4a–4c illustrate different types of separator element units consisting of three integrated U-shaped beams. Similarly to the embodiment shown in FIG. 3a, these triple-units are adapted to provide for a multileveled flow. However, to make this possible a section of one of the beams must be removed and separating plates be inserted, as will be explained in connection with FIGS. 5a–5c and FIG. 6.

Three different constructions are shown in FIGS. 4a–4c. As has been discussed above a tapered construction (FIG. 4a) may be desired, e.g. inside a circular reactor shaft, in which case the beam 40 located nearest the shaft centre has a smaller cross-section than the intermediate beam 42, which in turn has a smaller cross-section than the beam 44 furthest away from the centre.

If a tapered design is not considered necessary, the constructions illustrated in FIGS. 4b and 4c may be used. The construction of FIG. 4c requires the lowest number of separating plates, and this is the embodiment shown in FIGS. 5a–5c and FIG. 6. Note that in reality the three beams 50, 52 and 54 are attached to each other, e.g. by spot welding, however, in FIG. 4c they are shown somewhat separated for sake of clarity.

Figure 5A:
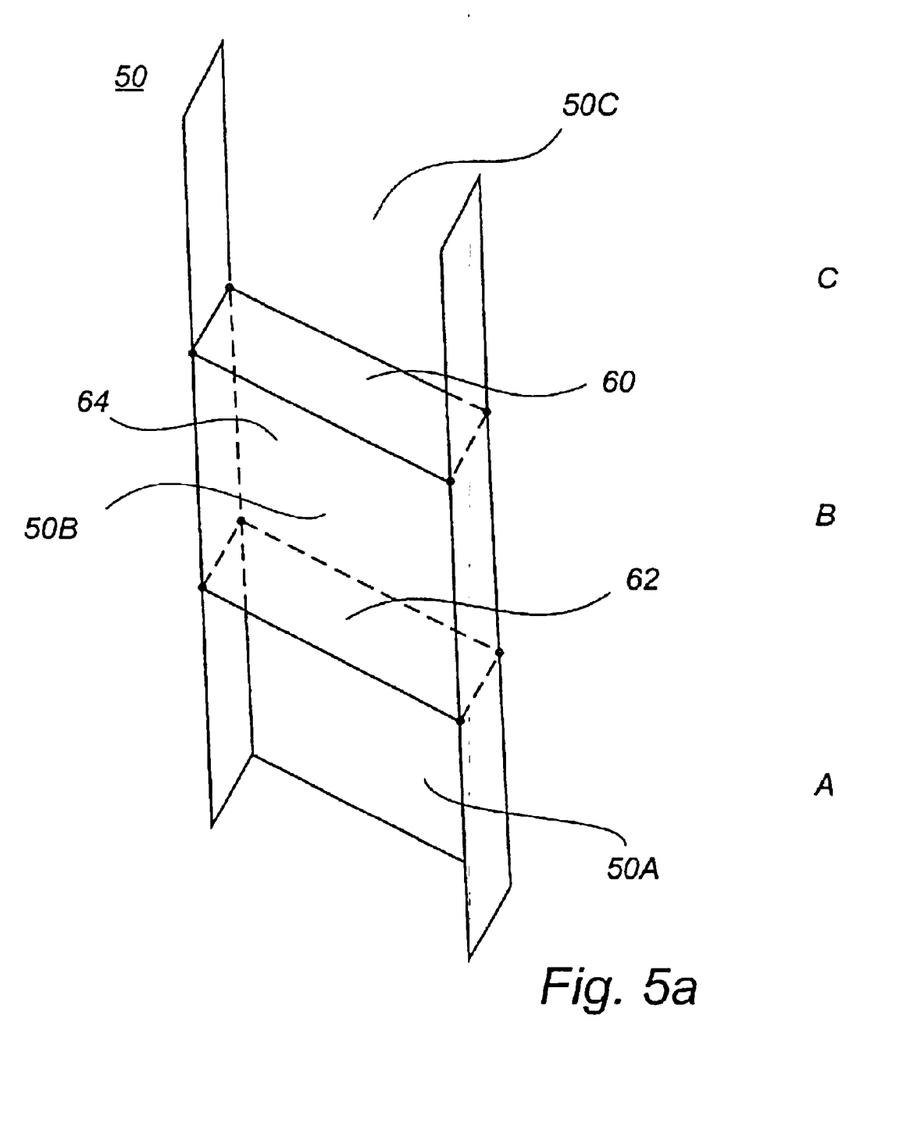
FIGS. 5a–5c illustrate the three U-shaped beams of FIG. 4c individually.
Figure 5B:
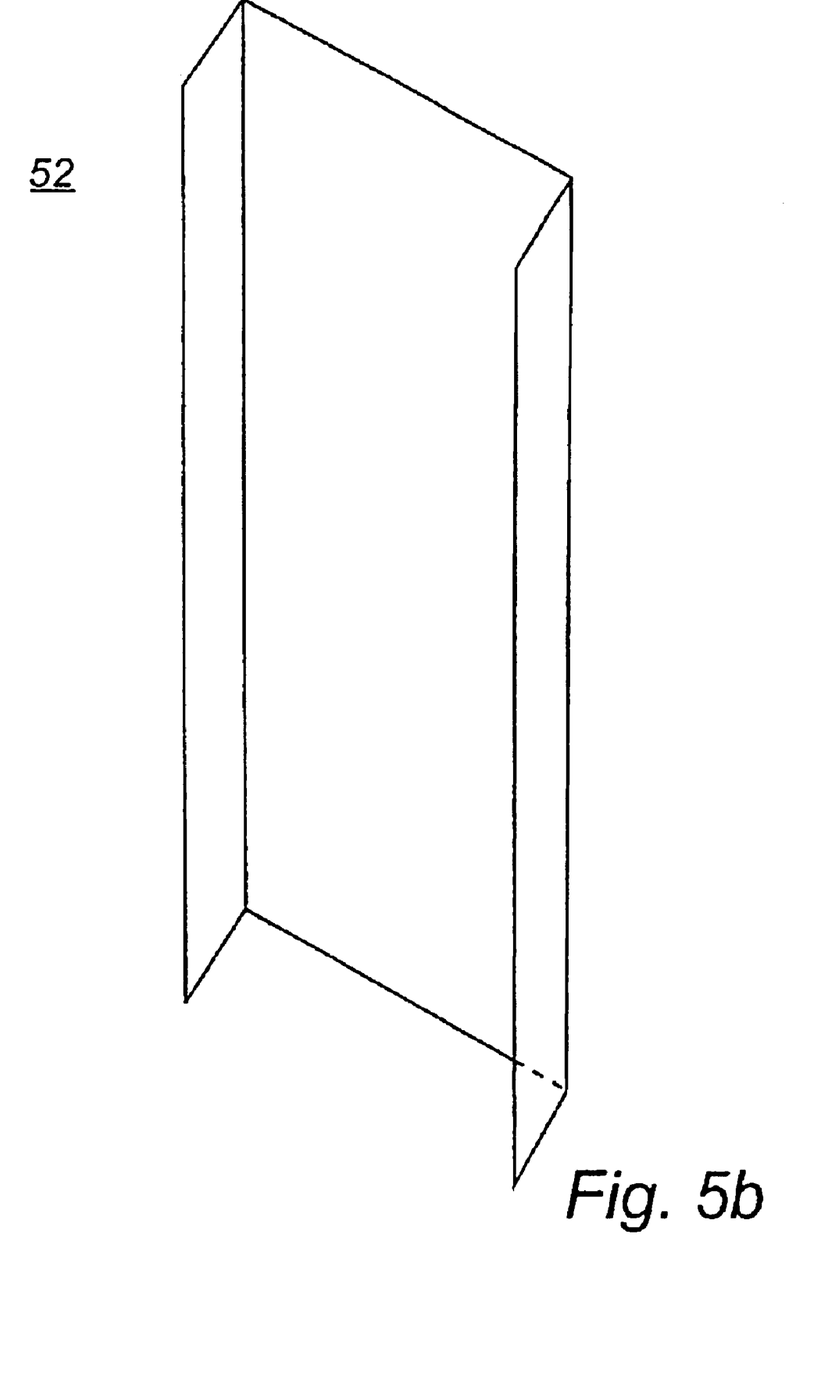
Figure 5C:
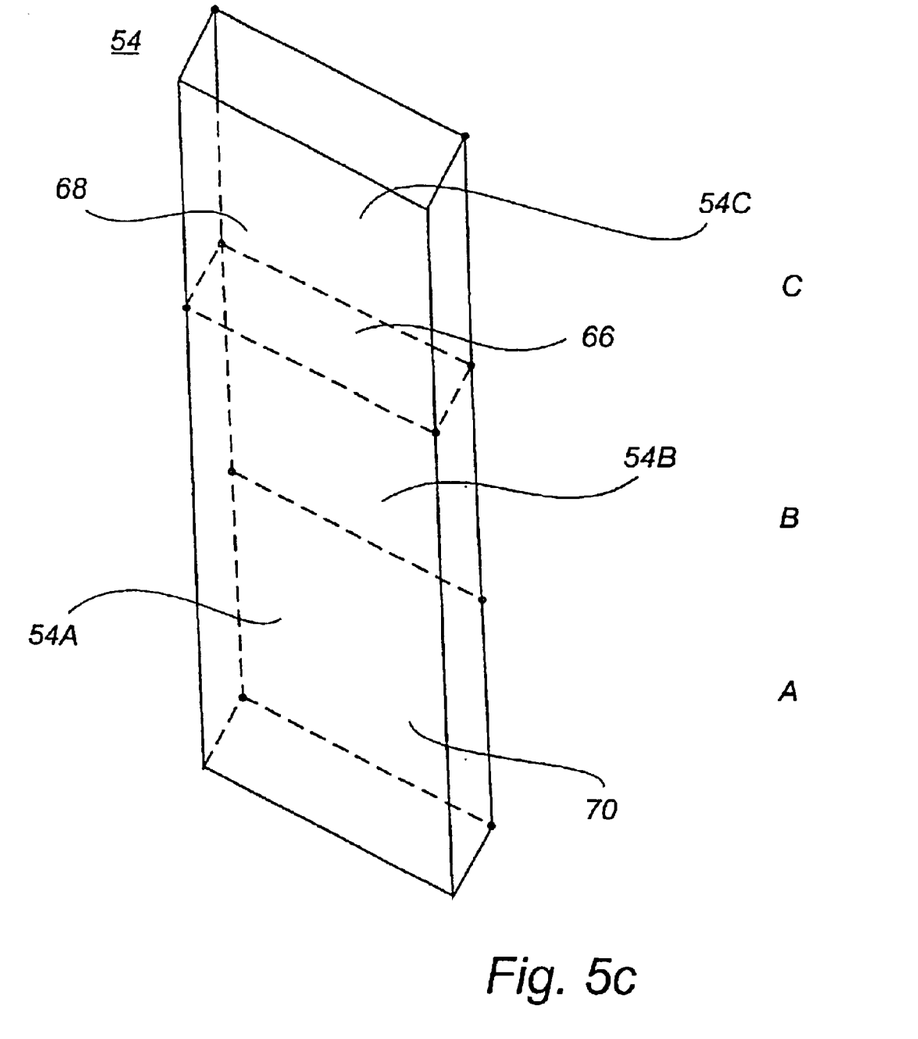

FIGS. 5a–5c illustrate the three U-shaped beams of FIG. 4c individually. The beams each have a lower section A, a middle section B and an upper section C, from which three particle separation levels will be achieved.

In FIG. 5a the first beam 50 is illustrated. At the upper section 50C of the beam 50, the bottom of the U has been removed. At the middle section 50B of the beam 50 two separating plates 60, 62 are inserted perpendicularly to the bottom of the U, and a plate 64 parallel thereto covering the area between the perpendicularly inserted separating plates 60, 62. Thus, a box has been provided over the middle section 50B mechanically separating the three sections 50A–C from each other.

In FIG. 5b the second beam 52 is illustrated. As can be seen it is a standard U-shaped beam with no modifications.

In FIG. 5c the third beam 54 is illustrated. A separating plate 66 is inserted perpendicularly to the bottom of the U, at the transition between the upper section 54C and the middle section 54B of the beam 54. A plate 68 extending upwards from the separating plate 66 covers the upper section 54C of the beam 54. Thus the upper section 54C is mechanically separated from the middle section 54B and the lower section 54A. A plate 70 arranged parallel to the bottom of the U is covering the lower section 54A of the beam 54.

Figure 6:
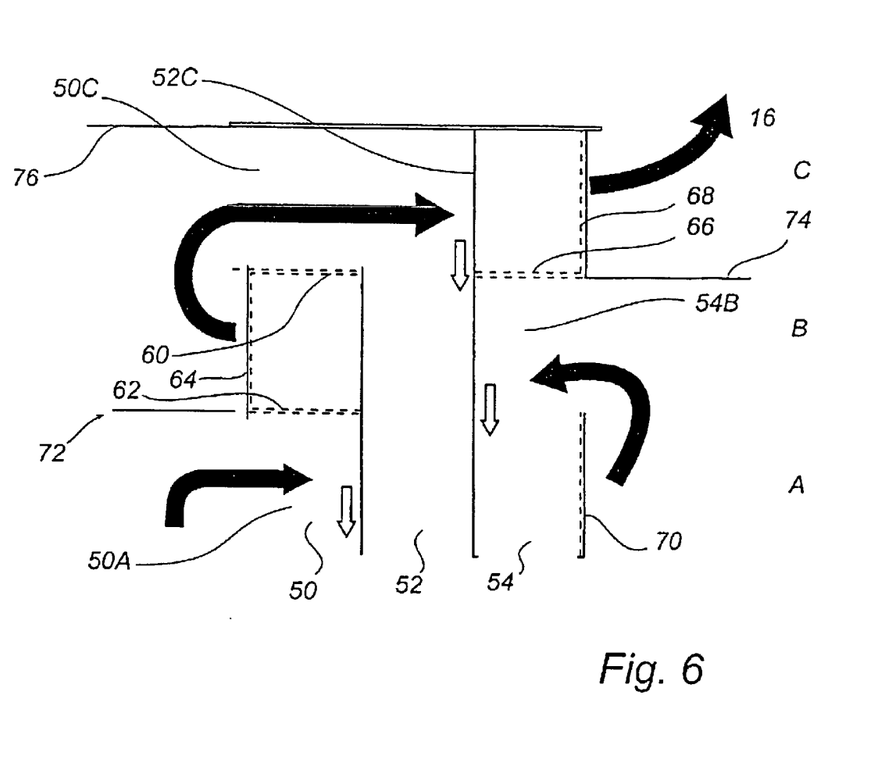
FIG. 6 illustrates the flow path through the beams of FIGS. 5a–5c, when they have been attached to each other.

FIG. 6 illustrates the gas flow path (solid arrows) through the beams 50, 52, 54 of FIGS. 5a–5c, when they have been attached to each other, and the respective parts have been depicted with the same reference numerals. The gas directed by a support plate 72 and separating plate 62 enters the configuration at the lower section 50A of the first beam 50. While the particles can impinge on the bottom of the U of the first beam 50, the gas passes all three beams (between two adjacent triple-units). Next, the gas flows upwards but is hindered by a cover plate 74, which corresponds to the cover plate 28 in FIG. 3a, forcing in co-operation with separating plate 66 the gas to flow back past the three beams. However, remaining particles can impinge on the bottom of the U of the third beam 54, at the middle section 54B thereof. Note that the gas can only enter the third beam 54 at its middle section 54B because of the plate 70 covering the lower section. Thereafter, the gas is caused to double-back again by a support plate 76, and enters the first beam 50 at the upper section 50c thereof. The plate 64 refuses entrance of the gas at the middle section of the first beam 50. Since the bottom of the U is removed at section 50c and the separating plate 60 is provided for mechanical isolation of the upper section from the other sections, the gas will pass through the first beam 50 to the second beam 52. This time remaining particles can impinge on the bottom of the U of the second beam 52, at the upper section 52C thereof. Finally, having no other way to flow (because of plate 68 and cover plate 74) the gas exits through the gas outlet 16.

This triple-unit beam design is preferably arranged in a circular configuration as the beams in FIG. 2. Thus, although not shown, to the left of the triple-unit is the outer wall of the top portion of the reactor, and to the right is the centre of the reactor (compare with the left half of FIG. 3).

It is to be noted that numerous modifications and variations can be made without departing from the scope of the present invention defined in the accompanied claims.

What is claimed is:

1. Method for separating entrained particles from a gas in a fluidised bed reactor system which comprises a separation region defined by a cylindrical r-, $\phi$-, z-coordinate system, the method comprising the consecutive steps of:

leading the gas in the z-direction (axial direction), diverting the gas to flow substantially in the r-direction (radial direction), while keeping the gas circumferentially distributed in r $\phi$-planes, wherein the gas flows to and/or from substantially the whole circumference of the separation region in the r$\phi$- planes, and mechanically separating the particles from the gas while the gas is flowing substantially in the r-direction, the gas continuing to flow substantially in the r-direction after mechanical separation.

2. Method according to claim 1, comprising the further steps of:

causing the gas having flown in the r-direction to flow in a reversed r-direction, and mechanically separating the particles from the gas while the gas is flowing in a reversed r-direction.

3. Method according to claim 1, wherein in the cylindrical coordinate system (r,$\phi$),z) the gas is initially directed from a larger r-value towards a smaller r-value for a first separation step of at least one separation step, and after a last separation step of the at least one separation step, wherein, in the last separation step the gas is directed towards a smaller r-value, leading the gas away in the z-direction.

4. Method according to claim 2, wherein in the cylindrical coordinate system (r,$\phi$,z) the gas is initially directed from a larger r-value towards a smaller r-value, for a first separation step of at least one separation step, and after a last separation step of the at least one separation step in which last separation step the gas is directed towards a smaller r-value, leading the gas away in the z-direction.

5. Method for separating entrained particles from a gas in a fluidised bed reactor system, comprising the steps of:

causing the gas to flow in a stacked multileveled flow with consecutive particle separation levels $X_N$ ($X_1$, $X_2$, $X_3$, . . . , $X_N$ . . . ), N being an integer, directing the gas to flow in a first direction on the first level $X_1$, bringing the gas to the next level $X_2$ from the first level $X_1$, directing the gas to flow in a direction reversed to the first direction on the next level $X_2$, so as to create a doubled-back flow path, bringing the gas to additional particle separation levels, so as to cause the gas to flow in the first direction on levels with odd-numbered N and in the reversed direction on levels with even-numbered N, and mechanically separating the particles from the gas on each level.

6. Method according to claim 5, in which the gas is caused to flow from a center zone to a circumference of the center zone or vice versa, whereby the directions are essentially radial directions in respect of the center zone and the circumference associated thereto.

7. Fluidised bed reactor system including a particle separator for separating entrained particles from a gas having a flow path, comprising a set of non-centrifugal mechanical separator elements disposed in the flow path of the gas, so that the gas is able to pass between the separator elements while the inertia of the particles directs them to the separator elements upon which they impinge and are separated and removed from the gas flow, wherein the set of separator elements is arranged in a configuration having a center zone with a center axis, and a circumference, wherein directional means are provided for directing the gas so that gas passing through the set of separator elements flows from the circumference to the center zone of the configuration or vice versa.

8. System according to claim 7, in which the set of separator elements is arranged as a structure having consecutive particle separation levels $X_N$ ($X_1$, $X_2$, $X_3$, . . . , $X_n$ . . . ), N being an integer, wherein the directional means are arranged at the circumference and at the center zone of the configuration, so as to cause the gas to flow through the set of separator elements in one direction on levels with odd-numbered N and in the reversed direction on levels with even-numbered N.

9. System according to claim 7, wherein the configuration has a generally cylindrical shape, wherein the separator elements are arranged essentially symmetrically.

10. System according to claim 7, wherein the separator elements have an elongated shape and extend essentially in parallel with the center axis.

11. System according to claim 7, wherein the separator elements are channel-shaped beams having an essentially U-shaped cross-section, wherein the beams are arranged so that the particles impinge upon the bottom of the U and then fall down, guided by the channel-shaped beam, to be collected.

12. System according to claim 7, in which the set of separator elements forms a number of ring-shaped arrays being placed within each other.

13. System according to claim 12, in which the separator elements of an array are circumferentially displaced with respect to the separator elements of an adjacent array.

14. System according to claim 11, in which each U-shaped beam is provided with a respective additional U-shaped beam attached in parallel thereto, each of the additional U-shaped beams being provided with a respective further U-shaped beam separator element attached in parallel thereto, forming a unit with three U-shaped beam channels, dividing plates being inserted in at least two U-shaped beam channels for mechanical segregation of the channels and a section of at least one of the elements in the unit being removed, so as to create three particle separation levels of impinge areas, one for each element in the unit, wherein the directional means are arranged to direct the gas in alternative level directions.

15. System according to claim 7, wherein the particle separator is located inside a reactor, and wherein the center axis is in parallel with the axis of the reactor.

16. System according to claim 7, wherein the configuration is circular cylindrical.

17. System according to claim 8, wherein the configuration has a generally cylindrical shape, wherein the separator elements are arranged essentially symmetrically.

18. Fluidised bed reactor system including a particle separator for separating entrained particles from a gas having a flow path, comprising a set of non-centrifugal mechanical separator elements disposed in the flow path of the gas, so that the gas is able to pass between the separator elements while the inertia of the particles directs them to the separator elements upon which they impinge and are separated and removed from the gas flow, wherein the set of separator elements is arranged as a structure having consecutive particle separation levels $X_N$ ($X_1, X_2, X_3, \ldots, X_n \ldots$), N being an integer, wherein directional means are arranged to cause the gas to flow through the various levels of the structure in one direction on levels with odd-numbered N and in the reversed direction on levels with even-numbered N.

19. System according to claim 18, in which the set of separator elements is arranged in a configuration having a center zone with a center axis, and a circumference, wherein the directional means are located at the circumference and at the center zone of the configuration, so as to cause the gas to pass through the set of separator elements from the circumference to the center zone of the configuration or vice versa.

20. System according to claim 19, wherein the configuration has a generally cylindrical shape, preferably with the separator elements being arranged essentially symmetrically.

* * * * *